United States Patent Office 3,275,559
Patented Sept. 27, 1966

3,275,559
HYDRAULIC FLUID
Clemence J. Henry, Newburgh, Paul R. Thomas, Beacon, and Peter Ferrence, Fishkill, N.Y., assignors to Texaco Inc., New York, N.Y., a corporation of Delaware
No Drawing. Filed Jan. 14, 1963, Ser. No. 251,008
7 Claims. (Cl. 252—75)

This invention relates to a compounded mineral lubricating oil and, more particularly, to a hydraulic fluid adapted for use in the automatic transmissions of motor vehicles.

In the simple fluid drive or torque converter, the hydraulic fluid is required mainly to transmit torque and to function as a heat transfer medium. However, in the more complicated automatic transmissions which have, besides a fluid coupling or a torque converter, wet clutches, planetary gearing and a hydraulic control mechanism, additional problems of adequate lubrication are involved. Rigorous requirements have been set up to qualify a hydraulic fluid for this service. These requirements include a viscosity index of at least 132 to provide improved operation over a wider temperature range, a flash point of 320° F. minimum, a fire point of 355° F. minimum and a pour point of −45° F. maximum to insure pumpability of the fluid at low atmospheric temperatures. In addition, the fluid must not have a detrimental effect on copper alloys as determined by its ability to pass a copper strip corrosion test; it must have no deleterious effect on the synthetic seals used in automatic transmissions; and it must have a high degree of oxidation resistance and be able to withstand prolonged heating at high temperatures without decomposition. The fluid must also possess excellent anti-frictional properties involving oiliness and extreme pressure characteristics to afford proper lubrication of the gearing, clutch plates and other parts of the automatic transmission.

A further important problem is the development of an automatic transmission fluid that will perform effectively in most if not all of the automatic transmissions currently in production. This is an extremely difficult criterion to meet since the automatic transmission mechanisms of the various motor cars have different and sometimes sharply opposed frictional requirements. For example, up to the present time no single automatic transmission fluid has satisfactorily met car manufacturers' standards for service in both the Oldsmobile Hydra-Matic and the Chevrolet Powerglide automatic transmissions.

As a measure of the ability of a hydraulic fluid to afford proper operation in an automatic transmission, several severe tests have been formulated. Thus, the fluid should pass severe oxidation tests including the Powerglide Oxidation test (Suffix A) and the Air-Blown Powerglide Oxidation test. Another rigorous requirement is that the fluid should pass so-called cycling tests, which involve the operation of an automatic transmission through repeated cycles of idling to full throttle at an elevated transmission oil temperature over a substantial period of time without substantial deposition of sludge or varnish formation and without injury to the clutch plates. The fluid should also function in such a test without objectionable chatter or squawking. The latter is a high-pitched sound produced by a "stick-slip" phenomenon of the clutch plates, particularly in the second-third upshift.

It has been found that a great variety of additives or inhibitors, which are generally effective in motor oil service for preventing oil oxidation and corrosion and for imparting other desirable qualities, either cannot be employed for the present service because the compounded mineral lubricating oil will then not meet the requirements for viscosity, viscosity index and pour point, or are ineffective in the present service because they do not suppress the squawk and/or actually increase the amount of sludge formed and the amount of deposits on the clutch plates of the automatic transmission. Moreover, the requirements for additives which satisfactorily suppress the squawking tendency and afford suitable operation in the cycling tests are quite different from those involved in ordinary crankcase lubrication or diesel motor oil service. In essence, the problem of formulating an effective automatic transmission lubricant depends upon the discovery of additive combinations which on being incorporated in a lubricating oil can meet the many severe requirements of this service.

In accordance with the present invention, it has been discovered that a hydraulic transmission fluid comprising at least 86 weight percent of a mineral lubricating oil, 0.05 to 0.15 weight percent of a reaction product of an N-alkyl alkylene diamine and a liquid saturated $C_{16-20}$ fatty acid and 0.10 to 0.25 weight percent of a liquid saturated $C_{16-20}$ fatty acid is remarkably and surprisingly effective in automatic transmissions. This is due to the discovery of the critical concentrations of the liquid saturated fatty acid and of the reaction product of an N-alkyl alkylene diamine with a liquid saturated fatty acid to impart anti-squawk properties and good rust protection to the automatic transmission lubricant. The hydraulic fluid of the invention generally also contains minor amounts of conventional components for such a fluid including 0.5 to 6.0 weight percent of an oil concentrate containing 30–40 percent of a polymer of mixed alkyl esters of methacrylic acid having above 25,000 molecular weight, 4.0 to 7.0 weight percent of a 50 percent oil concentrate of a basic barium salt of an olefin-$P_2S_5$ reaction product, 0.5 to 2.0 weight percent of an oil concentrate containing 62 percent of a basic alkaline earth metal alkyl phenolate, 0.2 to 1.0 weight percent of an alkylphenol and 0.02 to 0.10 weight percent of a 50 percent oil concentrate of a polyvalent metal salt of a dialkyl dithiocarbamic acid. The hydraulic transmission fluid of the invention is characterized by an SUS viscosity at 210° F. of 49 to 60, a viscosity index of at least 145 and a pour point at least as low as −45° F. This automatic transmission lubricant fully meets the AQ–A specifications set by the Auto Research Laboratories for automatic transmission lubricants.

The mineral lubricating oil which constitutes at least 86 weight percent of the composition is a refined oil or a mixture of refined oils selected according to the viscosity requirements of the particular service. For automatic transmissions where the requirements include an SUS viscosity of the compounded oil at 210° F. of 49 minimum up to 60 and at 0° F. of 7,000 maximum (extrapolated), the base oil or the major component thereof is generally a distillate oil lighter than an SAE 10 grade motor oil, such as one having an SUS viscosity at 100° F. less than 150 and generally between about 50 and 125. The distillate fraction can be a refined paraffinic distillate, a refined naphthenic distillate, or a mixture thereof. The flash point of the distillate component of the base oil will generally be substantially above 300° F.; if the distillate fraction constitutes the entire base oil, its flash point will usually be above 375° F.

A particularly preferred base oil comprises approximately 70 to 95 percent of a refined distillate oil and 5 to 30 percent of a refined residual fraction which imparts desired high flash point and lubricity to the base oil. A particularly preferred residual fraction comprises a paraffin base residuum which has been propane deasphalted and subjected to centrifuge dewaxing and which has an SUS at 210° F. below about 250. An effective base oil mixture comprises 68 percent of a furfural refined, acid-treated, clay-contacted, solvent-dewaxed, paraffin base distillate having an SUS at 100° F. of 100, a viscosity index above 100, a flash above 385° F., and a pour below about +10° F., 22 percent of an acid-treated naphthenic base distillate having an SUS at 100° F. of 60, a flash above 300° F. and a pour below −40° F., and 10 percent of a paraffin base residuum which has been propane-deasphalted, centrifuge-dewaxed, and clay-contacted, and which has an SUS viscosity at 210° F. of about 160, a flash above 530° F. and a pour of +5° F.

The diamine-fatty acid reaction product is essential both for good rust protection and in combination with the free fatty acid to impart anti-squawk properties to the automatic transmission fluid of this invention. This component is prepared by reacting a liquid saturated $C_{16-20}$ fatty acid with an N-alkyl alkylenediamine. A preferred fatty acid for making the reaction product is a liquid saturated $C_{18}$ fatty acid derived from tallow. A liquid, saturated $C_{18}$ fatty acid as described is commercially available as Emery 3101, a product of Emery Industries, Inc. 10-methyloctadecanoic acid and omega (2-n-propyl cyclohexyl)pelargonic acid are effective liquid saturated fatty acids. Other $C_{16-20}$ liquid saturated fatty acids are derived from coconut oils, soya oil, cotton seed oil and the like.

The diamines employed to make the reaction product, namely N-alkyl alkylenediamines, are prepared by the method described in U.S. 2,736,658. These diamines generally comprise $N-C_{12-18}$ alkyl alkylene diamines with the preferred diamines consisting of the $N-C_{12-18}$ alkyl trimethylene diamines. Effective diamines include N-hexadecyl-trimethylene diamine, N-octadecyltrimethylene diamine, N-tallow-trimethylene diamine, N-soya-trimethylene diamine, and N-dodecyl trimethylene diamine.

A specific preferred reaction product for the automatic transmission fluid of the invention is prepared by mixing approximately 6 parts by weight of N-tallow-trimethylene diamine, with 4 parts by weight of liquid saturated $C_{18}$ fatty acid at room temperature with stirring of the mixture. The temperature of the mixture rises to about 140° F., which is below the temperature at which decomposition takes place. The reaction product prepared as above is employed in the finished automatic transmission fluid in an amount ranging from about 0.05 to 0.15 weight percent, with the preferred amount being 0.10 percent. Amounts above about 0.15 weight percent drastically reduce or destroy the effectiveness of the automatic transmission fluid.

A small amount of free, liquid, saturated $C_{16-20}$ fatty acid is essential to the finished automatic transmission fluid. This fatty acid is employed in amounts from about 0.10 to 0.25 weight percent, with the preferred amount being about 0.15 weight percent. Generally the same fatty acid employed to make the reaction product referred to above is also used here. The use of this component in the stated amounts is critical to avoid squawking in automatic transmission use.

Viscosity index improvement of the transmission fluid of the invention is usually effected with a methacrylate ester polymer having the formula:

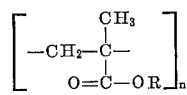

wherein R is an alkyl group or a mixture of alkyl groups containing from 1 to 20 carbon atoms, and $n$ is a number providing a molecular weight of the polymer above 25,000. Various methacrylate ester polymers of this type are known which possess pour depressant and viscosity index improving properties. A very satisfactory material of this type is a copolymer of the lower $C_4$ to $C_{14}$ alkyl methacrylate esters. A commercial methacrylate copolymer of this type, which is primarily a viscosity index improver, is sold under the trade name "Acryloid 710" by Rohm & Haas, wherein R comprises about 32 percent lauryl, 28 percent butyl, 26 percent stearyl and 14 percent hexyl groups and having a molecular weight above 50,000.

Another commercial material of this type is "Acryloid W–1600." "Acryloid W–1600" is similar to "Acryloid 710" above except that R in the formula comprises about 58 percent lauryl, 37 percent stearyl and 5 percent methyl groups.

Each of these commercial methacrylate copolymers is sold in the form of about 30 to 40 percent concentrate of the active polymer in a light colored mineral lubricating oil base, providing a clear amber colored viscous liquid having a kinematic viscosity at 210° F. of about 600 to 850 centistokes. In the following description, the copolymer will be listed on an oil-free basis, except where the trade names of commercial products are specified.

One or more of the methacrylate ester polymers, as described above, may be employed with the base oil in a proportion of about 0.2 to 2.0 percent by weight, preferably from about 1.0 to 1.6 weight percent, based on the hydraulic oil composition, in order to impart the desired viscosity, viscosity index and pour point. "Acryloid W–1600" or "Acryloid 710" may be employed alone or in admixture with very satisfactory results. Also it will be understood that other methacrylate ester polymers of the foregoing types can be employed.

A basic barium salt of an olefin-$P_2S_5$ reaction product is conventionally employed in the hydraulic fluid and functions as a detergent for the lubricating oil composition. A typical basic barium salt of an olefin-$P_2S_5$ reaction product is prepared by reacting 1.25 mols of an olefin, for example, a mono-olefin polymer of 600 to 2,000 molecular weight and a mole of $P_2S_5$ in the optional presence of a solvent at a temperature of 450° F. This is diluted with Pale Oil, hydrolyzed with steam and extracted with methyl alcohol. The raffinate is treated with barium oxide, methyl alcohol and water and blown with carbon dioxide. The product is then heated to evaporate the water and filtered. The basic barium salt of an olefin-$P_2S_5$ reaction product is employed as a 50 percent oil concentrate in the finished automatic transmission fluid in a concentration generally in the range of 4.0 to 7.0 weight percent with the preferred range being from about 6 to 6.5 weight percent.

Another conventional component of the automatic transmission fluid of the invention is a basic alkaline earth metal alkyl phenolate which also acts as a detergent in the transmission fluid. Typical basic alkaline earth metal alkyl phenolates include basic barium nonylphenolate, basic barium dodecyl cresolate and basic calcium dodecyl phenolate. The basic alkaline earth metal alkylphenolate detergent (as a 62 percent concentrate in oil) comprises from about 0.5 to 2.0 weight percent of the finished automatic transmission fluid with concentrations generally falling within the range of 0.6 to 0.7 weight percent.

An effective anti-oxidant is also generally employed in the hydraulic fluid of the invention. Suitable antioxidants are the alkylphenols, such as 2,3-, 2,6- and 3,5-diamyl phenol, 2,4-dimethyl-6-tertiary butyl phenol, 2,6-ditertiary butyl-4-methyl phenol. A particularly preferred alkylphenol as the antioxidant is [4,4'methylene bis(2,6-ditertiary butyl phenol)]. The anti-oxidant is employed in the finished automatic transmission fluid in an amount from about 0.2 to 1.0 weight percent with the preferred amount being about 0.3 weight percent.

A dithiocarbamate additive is another conventional component employed to further improve the anti-oxidant properties and the anti-corrosion properties of the present hydraulic fluid. Such an additive is a metal salt of an N-substituted dithiocarbamic acid of the formula:

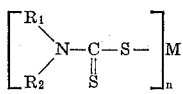

where M is a metal, $n$ is a whole number corresponding to the valence of M, and $R_1$ and $R_2$ are selected from the group consisting of hydrogen, alkyl, aryl, alkaryl or aralkyl, with at least one R being other than hydrogen. The alkali metal dithiocarbamate is prepared in known manner by reacting a primary or preferably a secondary amine with carbon disulfide and aqueous or alcoholic caustic soda or caustic potash. The various polyvalent metal dithiocarbamates may be prepared from the alkali metal dithiocarbamate by double decomposition. The preferred dithiocarbamates for the purposes of the present invention are the polyvalent metal dithiocarbamates in which $R_1$ and $R_2$ are both hydrocarbon and preferably alkyl groups having from 4 to 20 carbon atoms each to impart oil solubility. The preferred polyvalent metals are zinc and cadmium, although other metals can be used such as lithium, sodium, potassium, magnesium, calcium, barium, aluminum, copper, tin and lead.

Illustrative examples of dithiocarbamates that may be used in accordance with this invention are zinc dibutyl dithiocarbamate; cadium methyl actyl dithiocarbamate; calcium dicetyl dithiocarbamate; zinc diamyl dithiocarbamate; zinc monocetyl dithiocarbamate; zinc butyl amylphenyl dithiocarbamate; calcium diphenyl dithiocarbamate; and zinc di(cetyl phenyl) dithiocarbamate. A readily available commercial additive of this type is a 50 percent oil concentrate of zinc diamyl dithiocarbamate having the following tests:

Zn, 6.1%
S, 12.1%
$N_2$, 2.6%

The dithiocarbamate additive concentrate is employed in the present composition in a proportion within the range of about 0.02 to 0.10 percent by weight based on the hydraulic fluid.

The present hydraulic fluids optionally include a suitable anti-foam agent since hydraulic fluids are circulated rapidly in operation and air may be entrapped. For this purpose, a silicone polymer of high viscosity, such as dimethyl silicone polymer having a kinematic viscosity at 25° C. of about 1,000 centistokes and above, is preferably employed. This agent also desirably increases the flash point of the fluid. The use of a high viscosity silicone polymer in a hydraulic fluid of the mineral lubricating oil type to inhibit foaming and increase the flash point is disclosed in U.S. Patent No. 2,662,055. A silicone polymer is conveniently employed in the form of a concentrate in a hydrocarbon solvent such as kerosene. For example, a very satisfactory anti-foam agent for this purpose is prepared by diluting 10 grams of a dimethyl silicone polymer (1,000 centistokes at 25° C.) with kerosene to bring the volume to 100 cubic centimeters. A proportion of the order of 0.005 to 0.025 percent by weight of the immediately foregoing concentrate is ordinarily employed, preferably sufficient to provide about 50 to 200 parts per million of the silicone polymer concentrate on the basis of the hydraulic fluid.

It is often convenient to prepare an additive package which can be added to a suitable base oil to prepare the hydraulic fluid of the invention. An effective composition for this purpose comprises 86.6 weight percent of a 50 percent concentrate in oil of a basic barium salt of an olefin-$P_2S_5$ reaction product, 9.2 weight percent of a 62 percent concentrate in oil of a basic barium alkylphenolate, 1.4 weight percent of the reaction product of N-tallow trimethylenediamine and a liquid saturated $C_{18}$ fatty acid, 2.1 weight percent of a liquid saturated $C_{18}$ fatty acid and 0.70 weight percent of a 50 percent concentrate in oil of zinc diamyl dithiocarbamate. An effective hydraulic transmission fluid is produced by adding 6 to 10 weight percent of the foregoing additive package to a suitable lubricating oil together with the methacrylate ester polymer described hereinabove.

The following example illustrates the unusual effectiveness of the automatic transmission fluid of the invention in comparison to similar purpose fluids including a commercial automatic transmission fluid.

*Example 1*

The base oils in hydraulic fluids A and B below comprised 70 percent of a furfural refined acid treated, clay contacted, solvent dewaxed paraffin base distillate having an SUS at 100° F. of 100, a viscosity index about 100, a flash above 385° F. and a pour below +10° F., 22 percent of an acid treated naphthenic base distillate having an SUS at 100° F. of 60, a flash above 350° F. and a pour below —40° F., and 8 percent of a paraffin base residuum which had been propane deasphalted, centrifuge dewaxed and clay contacted and which had an SUS viscosity at 210° F. of 160, a flash above 540° F. and a pour of 0° F. This base oil mixture had a flash above 375° F., a pour substantially below 0° F., an SUS viscosity at 100° F. of 125 and a viscosity index of 91.

The base oil in composition C contained the same components as base oils A and B except that it comprised 68 volume percent of the paraffin base distillate, 22 volume percent of the naphthenic base distillate and 10 volume percent of the paraffin base residuum. The base oil mixture in hydraulic fluid C had a flash above 375° F., a pour substantially below 0° F., an SUS viscosity at 100° F. of 115 and a viscosity index of 86.

The base oil mixture in hydraulic fluid D contained a mixture of the same oils used in hydraulic fluids A–C except that it comprised 65 volume percent of the paraffin base distillate, 22 volume percent of the naphthenic base distillate and 13 volume percent of the paraffin base residuum. This base oil mixture had a flash above 385° F., a pour substantially below 0° F., an SUS viscosity at 100° F. of 120 and a viscosity index of 88.

The composition of hydraulic fluids A–D in weight percent are given in Table I below:

TABLE I

| Hydraulic Fluid | A | B | C | D |
|---|---|---|---|---|
| Base oil | 87.79 | 87.79 | 88.04 | 89.25 |
| Additive package [a] | | | | 6.25 |
| Basic barium salt of olefin-$P_2S_5$ reaction product [b] | 6.20 | 6.20 | 6.20 | |
| Basic barium alkylphenolate [b] | 0.66 | 0.66 | 0.66 | |
| 4,4′ methylene bis-(2,6-ditertiary butyl phenol) | .30 | .30 | .30 | |
| Zinc diamyl dithiocarbamate [b] | 0.05 | 0.05 | 0.05 | |
| Reaction product of 6 parts N-tallow trimethylene diamine and 4 parts liquid saturated $C_{18}$ fatty acid | 0.25 | 0.10 | 0.10 | |
| Liquid saturated $C_{18}$ fatty acid | | 0.15 | 0.15 | |
| Isopropyl oleate | 0.75 | 0.75 | | |
| Acryloid W-1600 | | | 4.50 | |
| Acryloid 710 | 4.00 | 4.00 | | 4.50 |
| Silicone fluid, p.p.m | 150 | 150 | 150 | 150 |
| Petrol Red 10B 25% dye conc., lb./1,000 gal | | | 1.69 | |

[a] A commercial additive package for preparing an automatic transmission fluid comprising 29 percent of a barium alkyl phenolate, 22% of a zinc-$C_8$ alcohol-$P_2S_5$ reaction product, about 4.5% of free neutral fat and the balance a carrier oil.
[b] Expressed as an oil concentrate.

Hydraulic fluids B and C represent transmission fluids according to this invention. Hydraulic fluids A and D were tested for comparison, the latter being representative of a hydraulic fluid prepared from a commercially available additive package and the former as evidence of the critical concentrations of the essential components of the hydraulic fluid.

The tests employed to evaluate the automatic transmission fluids include the following:

The Oldsmobile 2025 Cycling test is carried out in a production V–8 Oldsmobile engine of 165 H.P. mounted on a regular dynamometer test stand, and driving a dynamometer through a production "Hydra-Matic" transmission. The throttle setting is varied by a cam-solenoid arrangement to provide a cycle of 30 seconds at idling speed and then 30 seconds at full throttle opening. During the full throttle opening the transmission shifts through all four forward speeds and then runs at full throttle speed. Conditions for this test include an average load of 135 H.P., a top speed in fourth gear at full throttle of 3,600 r.p.m., and a transmission oil temperature of 275° F. The test is run for a period of 100 hours, or for a lesser time up until oil failure. Oil failure is defined as that point at which the transmission takes more than 10 seconds to shift into fourth gear (with now satisfactory transmission fluids, the time is usually 4.5 to 6 seconds) or when excessive slippage is noted. After termination of the test, the transmission is disassembled and the condition of the oil and transmission noted. Of particular interest is the condition of the clutch plate facings. Also, close observation of sludge and varnish formation is made.

The Chevrolet Powerglide Cycling test is conducted using a 1958 Chevrolet V-8 engine. The cyclic operation consists of six-second full throttle accelerations from idle to 4150 engine r.p.m. At 4150 r.p.m., the transmission is set to shift into high. Then the throttle is closed for six seconds while decelerating through transmission downshift to idle. This 12-second cycle is repeated 5,000 times (about 17 hours) or until transmission malfunction occurs. As in the above Oldsmobile Cycling test, the clutch plate facings, sludge and varnish formation are rated.

The results of the foregoing tests are given in Table II below:

TABLE II

| | A | B | C | D |
|---|---|---|---|---|
| Flash, COC° F | 385 | 385 | 375 | 385 |
| Fire, COC° F | | | 415 | 420 |
| Kinematic viscosity: | | | | |
| SUS at 0° F. (extrap.) | | 5019 | 3868 | 5526 |
| SUS at 100° F | 194 | 195 | 170 | 208 |
| SUS at 210° F | 51.6 | 51.8 | 49.7 | 52.1 |
| Viscosity index | 145 | 146 | 151 | 140 |
| Pour point, ° F | −55 | −60 | −50 | −50 |
| ASTM distilled water rust | clean | clean | clean | clean |
| Corr. Cu strip 3 hrs./300° F., ASTM rating | 2A | 1B | 1B | 2A |
| Detroit transmission foam test | pass | pass | pass | pass |
| Stick-slip test, 90 lb. load: Coefficient of friction (static/kinetic) | 0.13/0.14 | 0.15/0.15 | 0.14/0.15 | 0.10/0.11 |
| Powerglide oxidation test (suffix A) (275° F./300 hr.): | | | | |
| Varnish/sludge | | | 98/93 | 92/82 |
| Used oil, Vis. S.U.S. at 100° F | | | 175 | 182 |
| Air-Blown Powerglide oxidation test (6 liters/hr. air −275° F./240 hr.): | | | | |
| Varnish/sludge | | | 98/94 | 87/88 |
| Viscosity, used, S.U.S. at 100° F | | | 199 | 233 |
| Chevrolet Powerglide cycling test: | | | | |
| Completion=5,000 cycles | 5,000 | 5,000 | 5,000 | 1,344 |
| Average Clutch Plate Rating a | 7 | 8 | 8 | 2 |
| Varnish/Sludge Rating | 100/93 | 100/94 | 100/95 | not rated |
| Oldsmobile 2025 cycling test: | | | | |
| Completion=100 hrs | 57, 49 | 91, 100 | 69, 100 | 100 |
| Average clutch plate rating a | 9 | 9 | 9 | 8 |
| Varnish/sludge rating | 99/94 | 99/96 | 99/95 | 99/93 |
| Rubber swell (Acadia 3612) vol. change, percent | −0.6 | +0.3 | −0.1 | −0.2 | a New Clutch Plate=10.

The foregoing results demonstrate the surprising effectiveness of the automatic transmission fluid of the invention, namely B and C of Table I. In addition to satisfying all of the physical requirements of an effective automatic transmisson fluid, hydraulic fluids B and C are resistant to oxidation under severe oxidation conditions. Moreover, despite the frictional difference between the two types of cycling tests, these fluids satisfactorily completed both the Chevrolet Powerglide Cycling test and the Oldsmobile 2025 Cycling test. An automatic transmission fluid similar to B and C above containing stearic acid instead of the liquid saturated $C_{18}$ fatty acid caused the formation of insoluble barium stearate which separated out of solution and produced an unsatisfactory hydraulic fluid.

The performance of the hydraulic fluid of the invention is most significant in comparison to the performance of Hydraulic Fluid A and of Hydraulic Fluid D. While Fluid A differed in composition only in containing a larger amount of the reaction product of an N-alkyl alkylene diamine and a liquid saturated fatty acid and in containing no free liquid saturated fatty acid, it failed the Oldsmobile 2025 Cycling test. Hydraulic Fluid D which is representative of an automatic transmission fluid produced from a commercially available automatic transmission fluid package completely failed the Chevrolet Powerglide Cycling test. Only the hydraulic fluids of the invention gave an outstanding overall performance in the many tests qualifying an automatic transmission lubricant.

Obviously, many modifications and variations of the invention as hereinbefore set forth may be made without departing from the spirit and scope thereof and, therefore, only such limitations should be imposed as are indicated in the appended claims.

We claim:

1. A hydraulic transmission fluid adapted for automatic transmissions consisting essentially of at least 86 weight percent of a mineral lubricating oil, 0.05 to 0.15 weight percent of a reaction product prepared by reacting about 6 parts by weight of an $N-C_{12-18}$ alkyl alkylene diamine and about 4 parts by weight of a liquid saturated $C_{16-20}$ fatty acid at a temperature from room temperature up to about 140° F. and 0.10 to 0.25 weight percent of a liquid saturated $C_{16-20}$ fatty acid, said hydraulic fluid having improved anti-squawking properties.

2. A hydraulic transmission fluid according to claim 1 in which said reaction product of said $N-C_{12-18}$ alkyl alkylene diamine and said liquid saturated $C_{16-20}$ fatty acid is present in an amount of 0.10 weight percent and said liquid saturated $C_{16-20}$ fatty acid is present in an amount of 0.15 weight percent.

3. A hydraulic transmission fluid adapted for automatic transmissions consisting essentially of at least 86 weight percent of a mineral lubricating oil, 0.05 to 0.15 weight percent of a reaction product prepared by reacting about 6 parts by weight of an N-tallow trimethylene diamine and about 4 parts by weight of a liquid saturated $C_{18}$ fatty acid at a temperature from room temperature up to about 140° F. and 0.10 to 0.25 weight percent of a liquid saturated $C_{18}$ fatty acid, said hydraulic fluid having improved anti-squawking properties.

4. A hydraulic transmission fluid according to claim 3 in which said mineral lubricating oil consists essentially of a mixture of 70 to 95 weight percent of a refined distillate oil and 5 to 30 weight percent of a refined residual fraction.

5. A hydraulic transmission fluid according to claim 3 in which said mineral lubricating oil consists essentially of a mixture of 68 weight percent of a furfural-refined, acid-treated, clay-contacted, solvent-dewaxed paraffin base distillate having an SUS at 100° F. of 100, a viscosity index about 100, a flash above 385° F. and a pour below 0° F., 22 weight percent of an acid-treated, naphthenic base distillate having an SUS at 100° F. of 60, a flash above 300° F. and a pour below −40° F. and 10 weight percent of a paraffin base residuum which has been propane-deasphalted, centrifuge-dewaxed and clay-contacted and having an SUS viscosity at 210° F. of 160, a flash above 540° F. and a pour of 0° F.

6. A hydraulic transmission fluid adapted for automatic transmissions consisting essentially of at least 86 weight percent of a mineral lubricating oil, 0.10 weight percent of reaction product prepared by reacting about 6 parts by weight of an N-tallow trimethylene diamine and about 4 parts by weight of a liquid saturated $C_{18}$ fatty acid at room temperature, 0.15 weight percent of a liquid saturated $C_{18}$ fatty acid, 0.5 to 6.0 weight percent of an oil concentrate containing 30–40 weight percent of a polymer of mixed alkyl esters of methacrylic acid having a molecular weight of at least 50,000, 4.0 to 7.0 weight percent of a 50 weight percent oil concentrate of a basic barium salt of an olefin-$P_2S_5$ reaction product, 0.5 to 2.0 weight percent of an oil concentrate containing 62 weight percent of a basic barium nonylphenolate, 0.2 to 1.0 weight percent of [4,4′methylene bis(2,6-ditertiarybutylphenol)] and 0.02 to 0.10 weight percent of a 50 weight percent oil concentrative of a zinc diamyl dithiocarbamate, said hydraulic fluid having improved anti-squawking properties.

7. A hydraulic transmission fluid according to claim 6 characterized by an SUS viscosity at 210° F. of 49 to 60, a viscosity index of at least 145 and a pour point at least as low as −45° F.

References Cited by the Examiner
UNITED STATES PATENTS

| | | | |
|---|---|---|---|
| 2,528,348 | 10/1950 | Denison et al. | 252—75 |
| 2,681,891 | 6/1954 | Bos et al. | 252—75 |
| 2,736,658 | 2/1956 | Pfohl et al. | 252—51.5 X |
| 2,961,408 | 11/1960 | Havely et al. | 252—75 |
| 3,039,967 | 6/1962 | Henry et al. | 252—75 |
| 3,050,465 | 8/1962 | Francis | 252—77 X |

LEON D. ROSDOL, *Primary Examiner.*

JULIUS GREENWALD, ALBERT T. MEYERS,
*Examiners.*

R. D. LOVERING, *Assistant Examiner.*